INVENTORS.
Theodore L. Giusti
Norman Moreau
BY William D. Fosdick
AGENT

INVENTORS.
Theodore L. Giusti
Norman Moreau
BY
William D. Fosdick
AGENT

Oct. 11, 1966 T. L. GIUSTI ETAL 3,277,994
ARTICLE TRANSFER APPARATUS
Filed Sept. 14, 1964 6 Sheets-Sheet 5

INVENTORS.
Theodore L. Giusti
Norman Moreau
BY
William D. Fosdick
AGENT

INVENTORS.
Theodore L. Giusti
Norman Moreau
BY
William D. Fosdick
AGENT

United States Patent Office 3,277,994
Patented Oct. 11, 1966

3,277,994
ARTICLE TRANSFER APPARATUS
Theodore L. Giusti, North Providence, and Norman Moreau, Lincoln, R.I., assignors to Corning Glass Works, Corning, N.Y., a corporation of New York
Filed Sept. 14, 1964, Ser. No. 396,232
2 Claims. (Cl. 198—31)

This invention relates to means for transferring articles from one conveyor to another conveyor moving along a path transverse to the path of the first conveyor. In particular, the invention relates to means for transferring a plurality of fragile glass articles from a conveyor carrying the articles from a forming machine to another conveyor moving along a path perpendicular to the path of the first conveyor and carrying the glass articles through an annealing lehr.

It is an object of the invention to provide means for effecting such transfer of fragile articles with maximum speed while minimizing the mechanical shock to which the articles are subjected.

A further object is the provision of such means whereby groups of articles may be simultaneously transferred without disturbing their relative orientations with respect to one another.

These and other objects are accomplished by provision of a transfer apparatus hereinafter described with reference to the accompanying drawing, in which.

Figure 3:
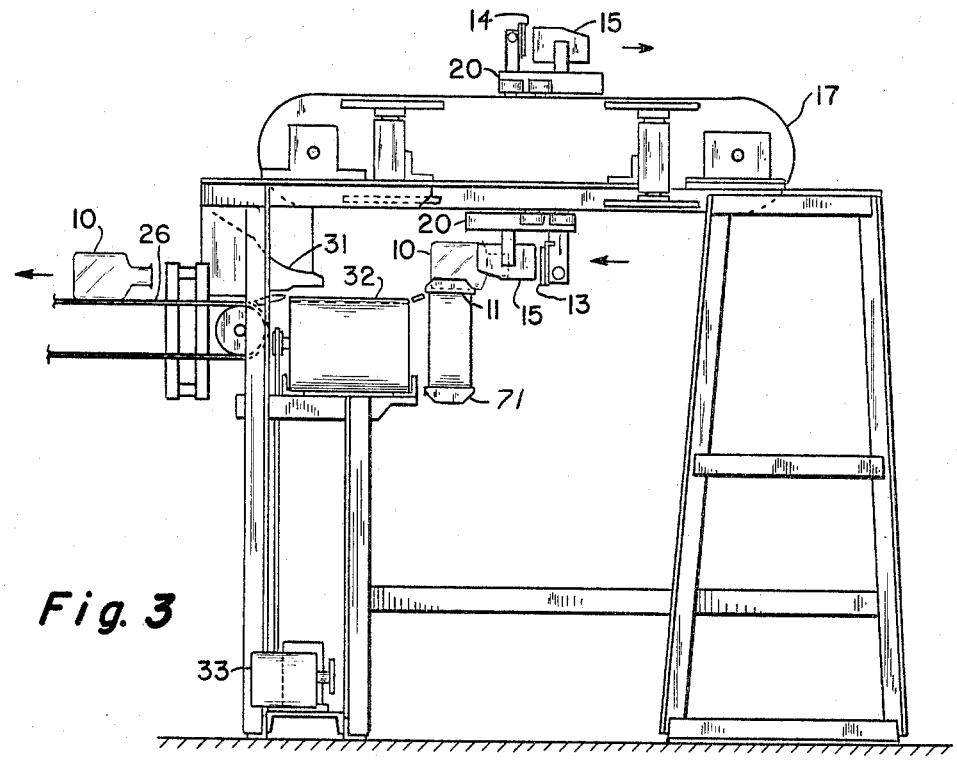
FIGURE 3 is a side elevational view thereof.
Figure 4:
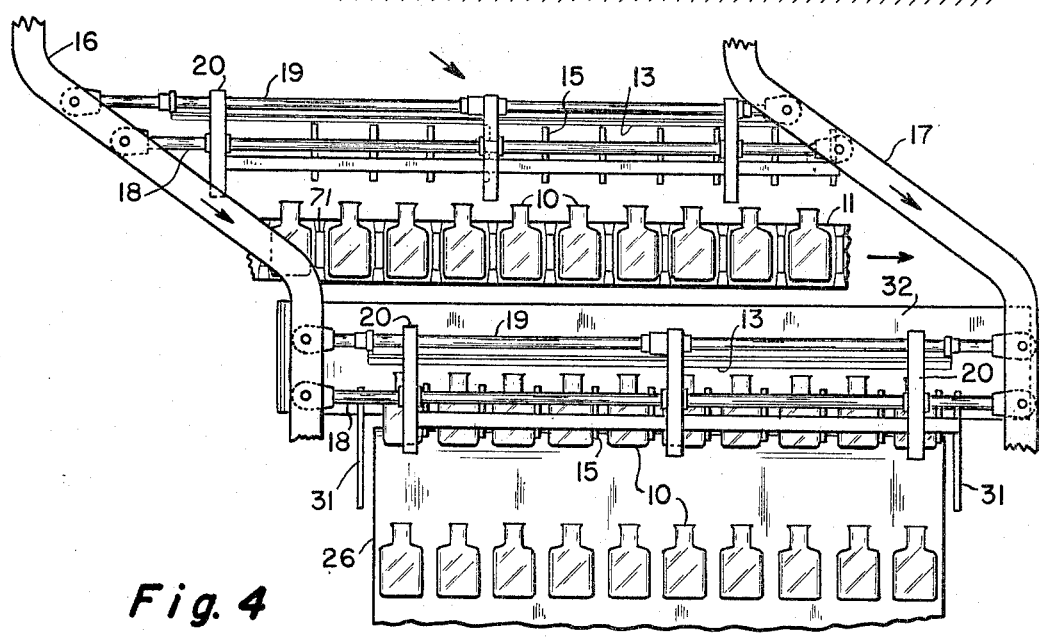
Figure 5:
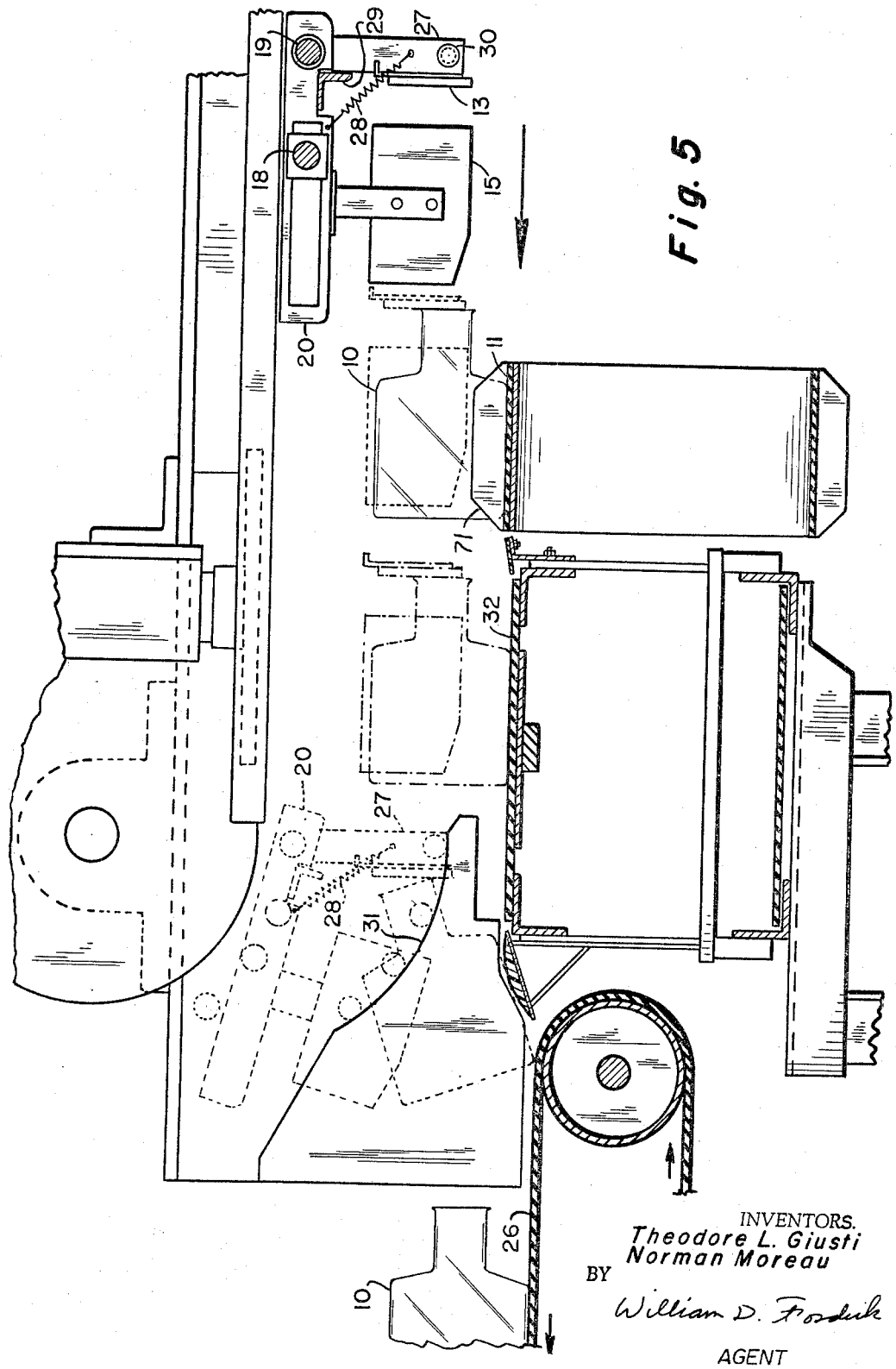
Figure 6:
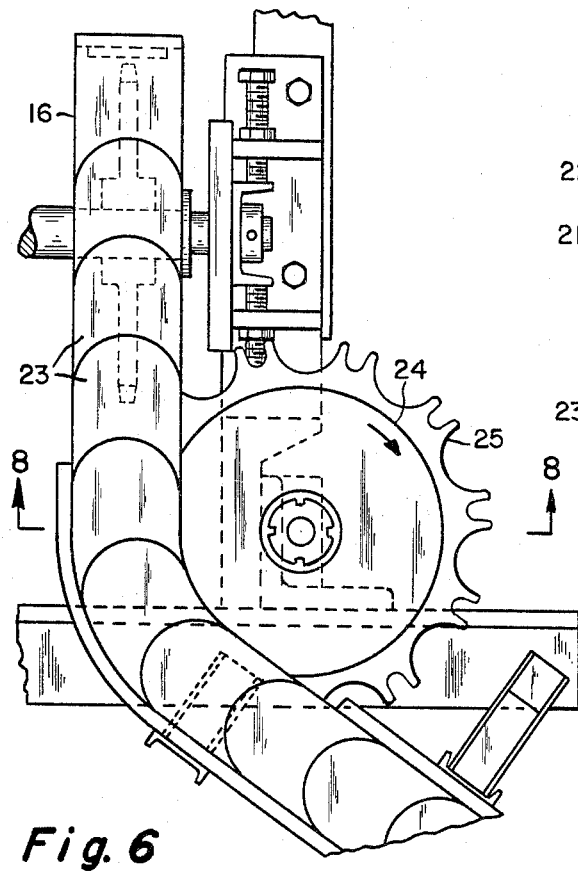
Figure 7:
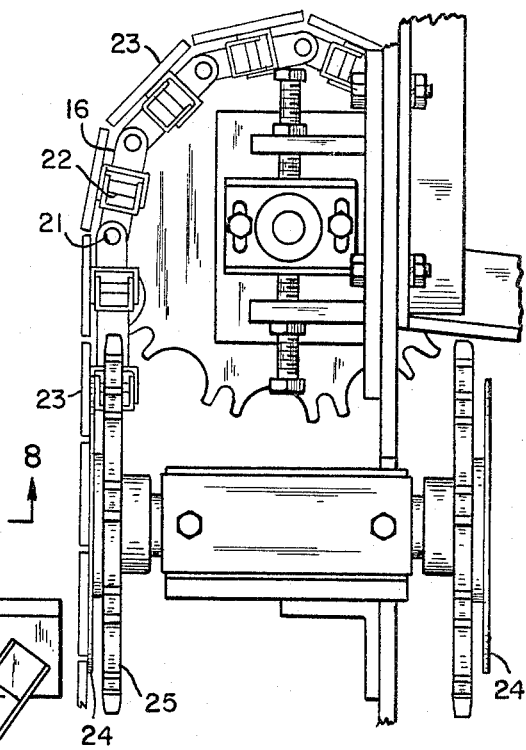
Figure 8:
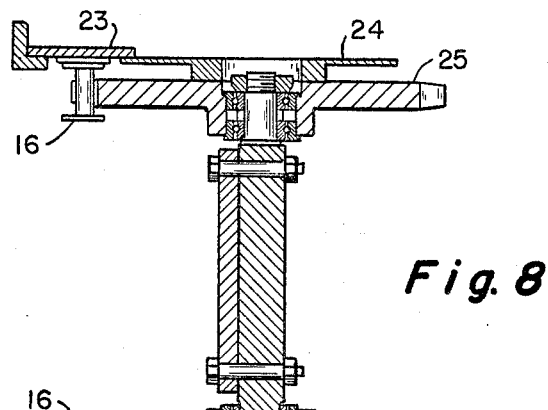
Figure 9:
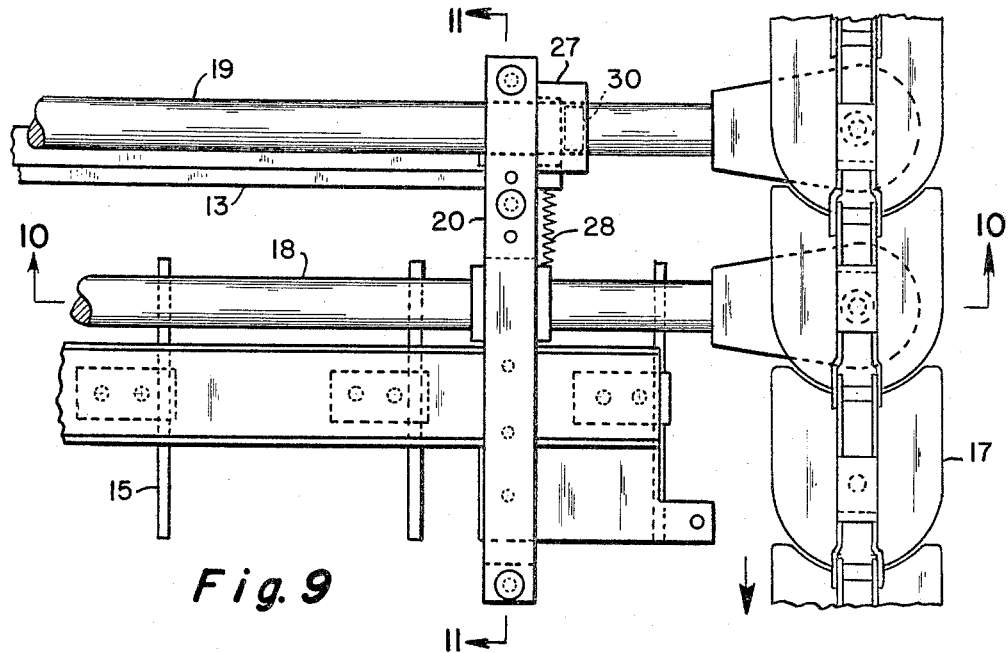
Figure 10:
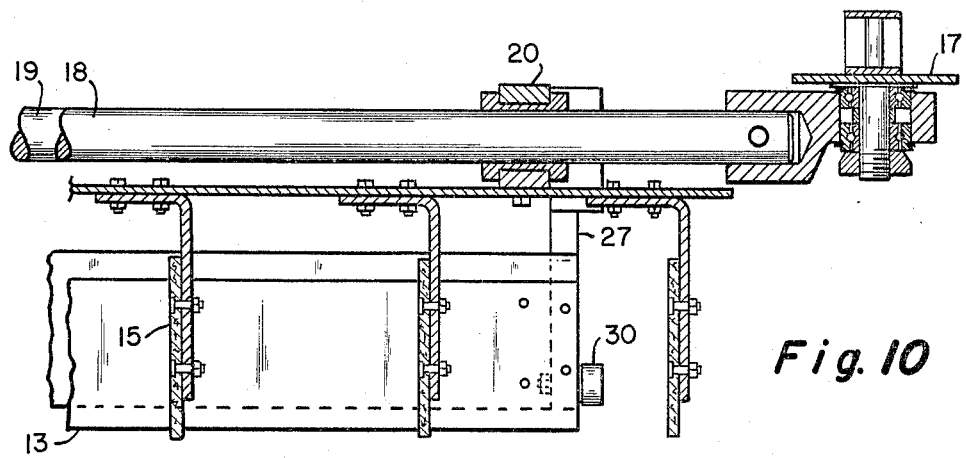
Figure 11:
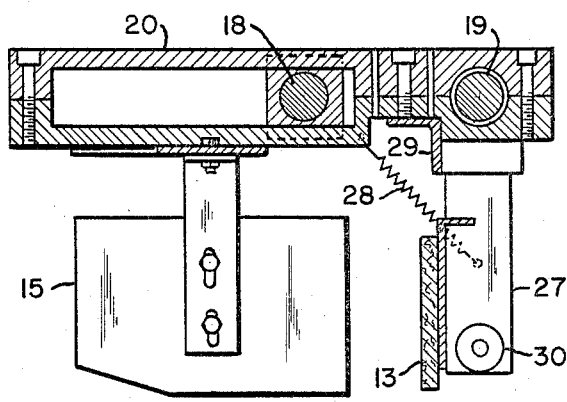

FIGURE 4 is a plan view of a portion of the apparatus, illustrating the pushing means thereof in two successive positions during operation thereof, FIGURE 5 is an enlarged side elevational view of a portion of the apparatus of FIGURE 3, illustrating the operation thereof, FIGURE 6 is a top plan view of a portion of the apparatus, FIGURE 7 is a side elevational view of the portion illustrated in FIGURE 6, FIGURE 8 is a sectional view taken on line 8—8 of FIGURE 6, FIGURE 9 is a top plan view of a portion of the apparatus, FIGURE 10 is a sectional view taken generally on line 10—10 of FIGURE 9, and FIGURE 11 is a sectional view taken on line 11—11 of FIGURE 9.

Figure 1:
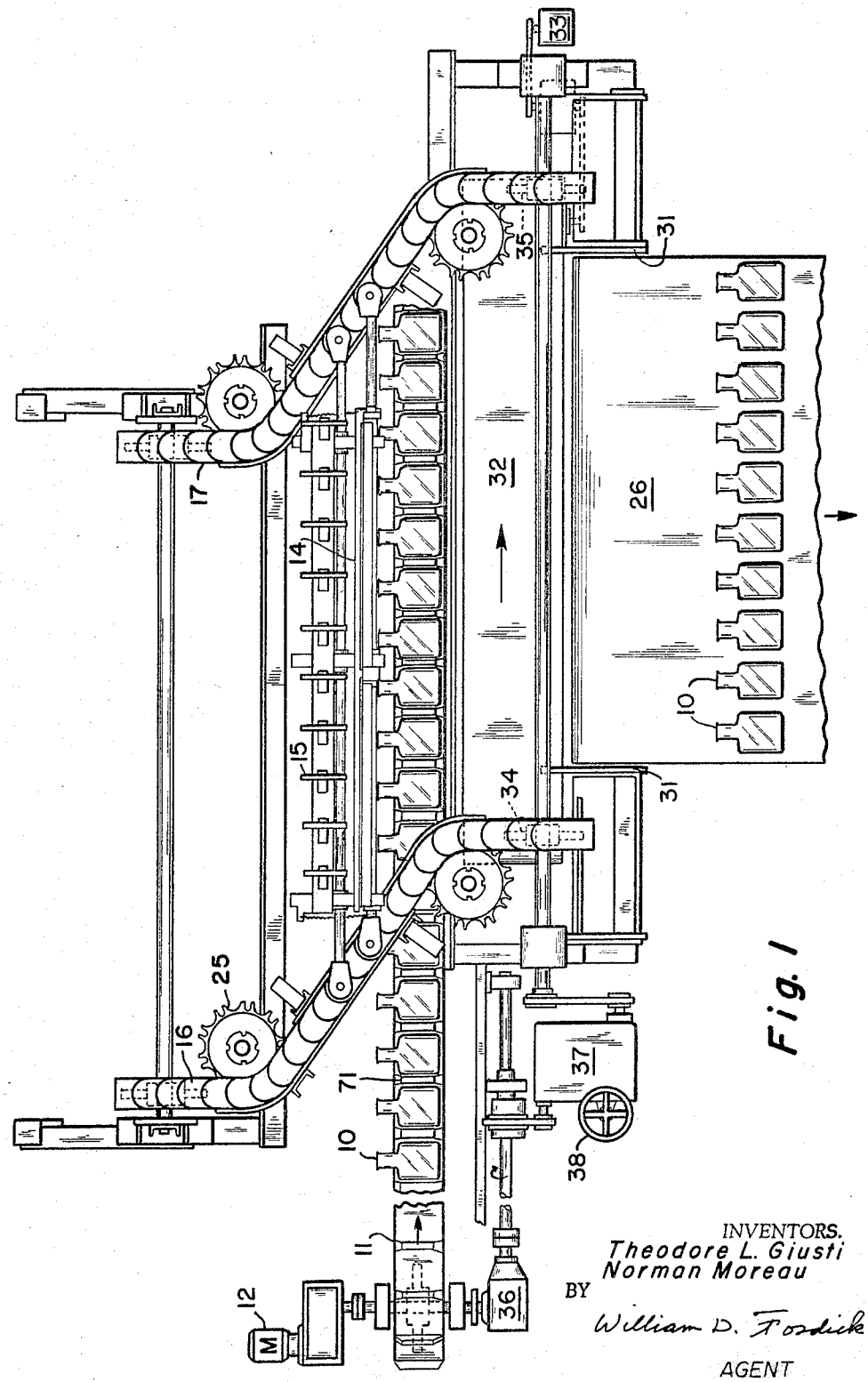
FIGURE 1 is a top plan view of the article transfer apparatus.

Referring to the drawing, a plurality of glass articles 10 are carried along a generally horizontal path on input conveyor 11, which moves toward the right in the direction of the arrow in FIGURE 1. The articles are maintained in spaced orientation by means of separators 71. Input conveyor 11, which is in the form of an endless belt, is driven by means of motor 12. Glass articles 10 are continuously fed to conveyor 11 from a forming machine by means not illustrated.

Figure 2:
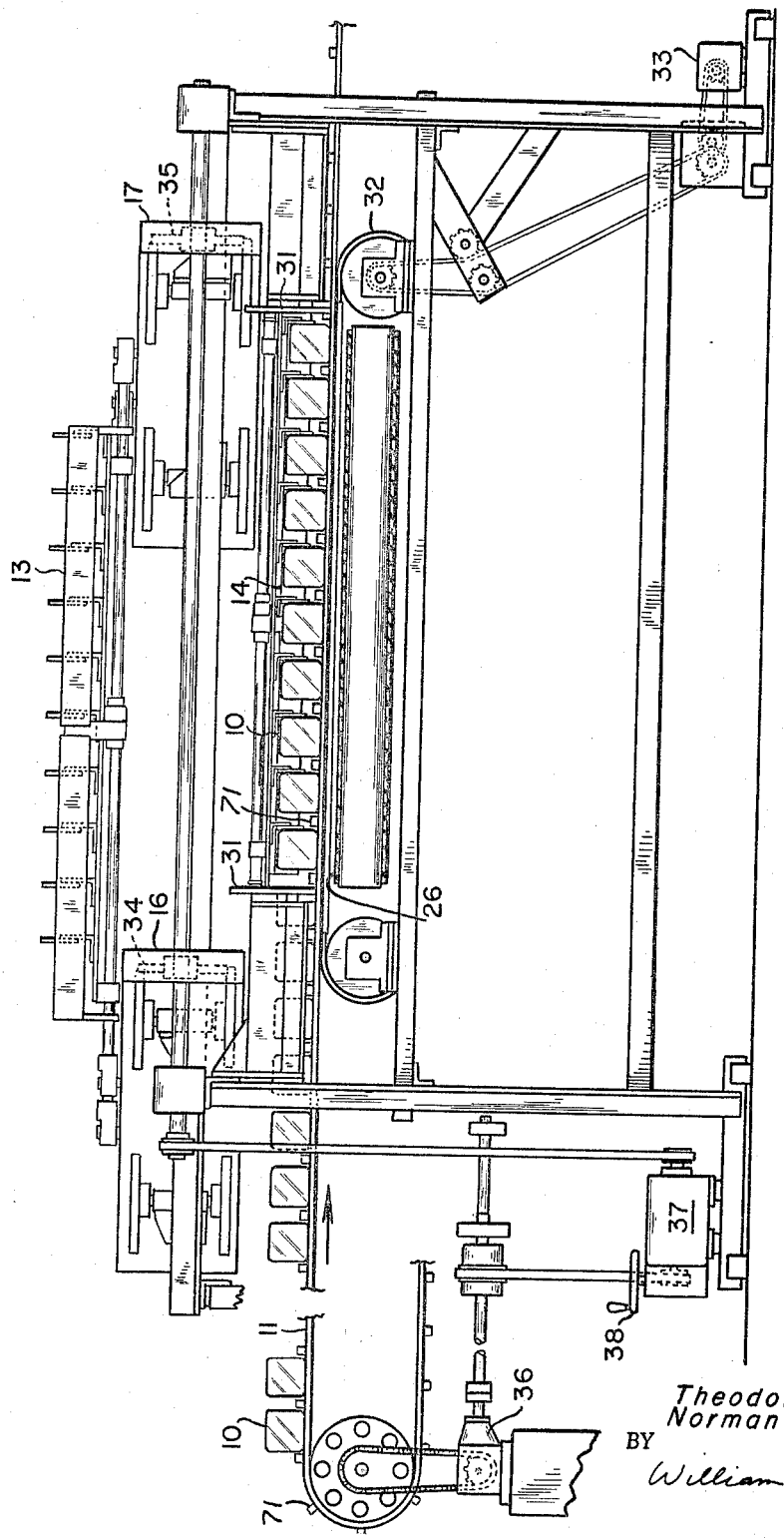
FIGURE 2 is an elevational view thereof.

Input conveyor 11 carries articles 10 beneath the article transfer means, which includes two pushing bars 13 and 14, supported from, and movable along with, endless chains 16 and 17, as illustrated in FIGURES 1 and 2. Since pushing bars 13 and 14 are identical to one another, the construction and operation thereof will be described with reference to bar 13.

As illustrated in FIGURES 9-11, there is associated with each pushing bar a plurality of partitions 15. These partitions move in front of the pushing bar, as the bar and the partitions are carried along an endless path by means of support rods 18 and 19. As can be seen from examination of the drawing, pushing bar 13 and partitions 15 are rigidly supported by means of support member 20. Support member 20 is in turn rigidly supported from support bar 18 and is slidably supported on bar 19. Thus, as support bars 18 and 19 are carried along an endless path by means of chains 16 and 17, the transverse orientations of the pushing bar and partitions will be maintained by the fixed suspension thereof from support bar 18, while the weight thereof will be partially sustained by support bar 19, the sliding relationship between support member 20 and support bar 19 permitting relative axial movement between bars 18 and 19 as the chains move along their paths, as illustrated in FIGURE 4.

The construction and support of the chains are illustrated in FIGURES 6-8. Chain 16, is bendable vertically about pins 21 and horizontally about pins 22, illustrated in FIGURE 7. Plates 23 are connected to the respective links on the chain and are supported by discs 24, which rotate along with sprockets 25.

The manner in which pushing bar 13 and partitions 15 engage glass articles 10 may be seen from examination of FIGURE 4, which is a view showing the positions of the pushing means at two different locations during its travel. As glass articles 10 travel along input conveyor 11, their velocities are in the right-hand direction, illustrated by the arrow. Since it is the purpose of the transfer apparatus to redirect the glass articles along a path perpendicular to their original path, it is necessary that the component of motion of the articles in the right-hand direction of FIGURE 4 be completely eliminated and that a new velocity perpendicular thereto in the direction of the bottom of the drawing in FIGURE 4 be imparted to the articles. The apparatus accomplishes this result by causing the pushing bars and the partitions to move at the time of initial contact with the glass articles, and immediately prior thereto, along a path which has components of motion in both the direction of motion and the glass articles and the direction into which it is desired to redirect the motion of the glass articles. For this reason, the paths of chains 16 and 17 are oblique to the path of the input conveyor and, in the illustrated embodiment of the invention, form angles of 45° with both the initial and ultimate paths of the glass articles. The velocities of the chains along their paths are determined such that the components of velocity of the pushing bar and the partitions in the initial direction of motion of the glass articles is identical with the initial velocity of the glass articles. Thus, the pushing bar and partitions track the glass articles along their paths in the right-hand direction in FIGURE 4, while moving toward the articles. The glass articles are thereby maintained at a constant orientation between the partitions as the pushing bar approaches the articles, thereby permitting the articles to nest between the partitions. After the pushing bar and partitions have contacted the glass articles, the paths of the chains are such that the entire velocity of the pushing bar and partitions changes to the ultimate direction of motion of glass articles on output conveyor 26.

Thus, at the moment of impact between the pushing bar and the glass articles, there is superimposed upon the initial velocity of the glass articles an additional component equal to the initial velocity but perpendicular thereto. The glass articles are then, subsequent to impact with the pushing bar, traveling along a path 45° from their initial path and at a new velocity equal in magnitude to their original velocity multiplied by the square root of two. When the paths of the chains bend so as to direct the pushing bar along the ultimate segment of its path, perpendicular to the initial path of the glass articles, the glass articles will be directed onto the output conveyor 26 with their new velocity. Previously utilized article transfer means of the present type have utilized pushing bars which travel along their entire paths in directions perpendicular to the initial directions of motion of the glass articles. Thus, in such prior devices, glass articles handled thereby were accelerated abruptly in the direction of the ultimate motion thereof, rather than being accelerated, as by the present apparatus, in two stages, i.e., from an initial stage in which their velocity component in their ultimate direction of motion is zero, to an intermediate stage in which such component is equal in magnitude to their original velocity, to a final stage in which such component is accelerated by a factor equal to the square root of two.

The path of the pushing bar and partitions at the moment of impact with the articles being transferred in the present apparatus has been chosen for convenience to be at an angle of approximately 45° with the initial direction of motion of the articles. It will be appreciated that other paths may be utilized as long as the pushing means employed move along a path immediately prior to contact with the articles which path has a velocity component in the direction of motion of the articles substantially equal to the velocity of the articles along their paths, and as long as the velocity of the pushing means has a component perpendicular to the direction of motion of the article. It will be appreciated that the ultimate velocities at which the glass articles are ejected from the transfer means will depend upon the acute angle between the oblique segments of the paths of chains 16 and 17 and the direction of motion of conveyor 11, with greater angles producing greater ultimate velocities.

Further illustration of the operation of the present article transfer means is provided by FIGURE 5, which is a side view illustrating the operation of the transfer means from a position prior to contact with a glass article to its position immediately prior to completion of transfer of the article. Pushing bar 13 and partitions 15 move horizontally in the direction of the arrow. Pushing bar 13 is mounted on support 27, which is rotatably mounted on support bar 19. Pushing bar support 27 is maintained in a forward position against angle iron 29 by means of tension spring 28. Thus, when the pushing bar contacts glass article 10, some resiliency is provided at the moment of impact; however, the tension of spring 28 is sufficient to maintain the pushing bar with its leading surface generally oriented vertically. Pushing bar support 27 is provided with cam follower 30 which contacts cam 31 as the pushing bar moves along its path. The purpose of the cam and cam follower is to maintain the pushing bar oriented vertically for the entire time during which it is in contact with article 10, thus eliminating the possibility that when the pushing bar begins its upward ascent, it might have a tendency otherwise to lift one end of the glass articles.

Intermediate conveyor 32 is located between input conveyor 11 and output conveyor 26. The intermediate conveyor moves in a direction transverse to the direction of motion of the output conveyor, and its purpose is to carry away fragments of broken glass which are sometimes present as the result of breakage either during or subsequent to the formation of the articles. The intermediate conveyor is driven by means of motor 33, illustrated in FIGURE 2. Since partitions 15 travel along a path slightly above intermediate conveyor 32, small fragments of glass can pass beneath the partitions, while glass articles 10 are not affected by the intermediate conveyor, since lateral movement of the articles is prevented by partitions 15.

As has been previously mentioned, input conveyor 11 is driven by means of motor 12. As indicated in FIGURES 1 and 2, the driving sprockets 34 and 35 of chains 16 and 17, respectively, are indirectly driven by means of motor 12. Such driving is effected by means of right-angle gear box 36 and differential gear box 37. Differential gear box 37 comprises any conventional gear arrangement whereby the relative positions of rotation of an input shaft and an output shaft may be adjusted by means such as adjusting wheel 38. Inasmuch as such mechanisms are well known to those skilled in the art, the detailed construction thereof has not been illustrated. Thus, turning adjustment wheel 38 effects relative orientation between the pushing bar and articles 10 carried on input conveyor 11, thereby permitting the apparatus to be synchronized such that the partitions are placed between the glass articles during operation of the transfer mechanism.

The apparatus has been illustrated as employing two sets of pushing bars and partitions. It will be appreciated that, depending upon the length of chains 16 and 17, any number of pushing bars may be employed. Similarly, although the apparatus has been illustrated as employing pushing bars moving continuously along a closed path, it will be appreciated that such a continuous path is not necessary, and that the pushing bars and partitions employed in the present apparatus can, if expedient, be caused to reciprocate.

It will be apparent to those skilled in the art that further modifications may be made in the apparatus described as a preferred embodiment of the present invention. Accordingly, it is intended that the scope of the present invention be limited only by the scope of the appended claims.

We claim:
1. Transfer means for transferring a plurality of articles from a first conveyor moving along a first path to a second conveyor moving along a second path generally perpendicular to said first path, said transfer means comprising a pushing bar and a plurality of partitions capable of maintaining said articles separated from one another, means for moving said pushing bar and said partitions along a third path passing across and above said first path with a velocity having a first component parallel to said first path substantially equal to the velocity of said articles along said first path and having a second component of velocity perpendicular to said first component of velocity, and a third conveyor located between said first conveyor and said second conveyor and means for moving said third conveyor along a fourth path transverse to said second path and located beneath said third path by a distance sufficient to permit objects smaller than said articles to be removed from said transfer means prior to the transfer of said articles to said second conveyor.

2. Transfer means for transferring an article from a first conveyor moving along a first path to a second conveyor moving along a second path transverse to said first path, said transfer means comprising two endless chains movable along third and fourth parallel paths, a pushing bar supported from said chains and movable with said chains, a plurality of partitions movable along with said pushing bar and in front of said pushing bar and adapted to maintain said articles separated from one another as said articles are moved by said pushing bar, each of said third and fourth paths of said chains having a first segment obliquely crossing said first path above said first path, means for moving said chains along said third and fourth paths at equal velocities having components parallel to said first path which are equal to the velocity of said articles along said first path and having components perpendicular to said first path, each of said third and fourth paths having a second segment parallel to said second path, and a third conveyor located between said first conveyor and said second conveyor and means for moving said third conveyor along a fifth path transverse to said second path and located beneath said third and fourth paths by a distance sufficient to permit objects other than said articles to be removed from said transfer means prior to the transfer of said articles to said second conveyor.

References Cited by the Examiner

UNITED STATES PATENTS

| | | | |
|---|---|---|---|
| 2,252,937 | 8/1941 | Link et al. | |
| 3,040,867 | 6/1962 | Posten et al. | |
| 3,184,031 | 5/1965 | Dunlap | 198—24 |
| 3,198,309 | 8/1965 | Ogawa | 198—24 |

EVON C. BLUNK, *Primary Examiner.*

R. E. KRISHER, *Assistant Examiner.*